United States Patent
Uchida

(10) Patent No.: US 9,673,455 B2
(45) Date of Patent: Jun. 6, 2017

(54) LITHIUM-ION SECONDARY BATTERY

(71) Applicant: TOYOTA JIDOSHA KABUSHIKI KAISHA, Toyota-shi, Aichi (JP)

(72) Inventor: Yozo Uchida, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/419,505

(22) PCT Filed: Sep. 5, 2013

(86) PCT No.: PCT/JP2013/073935
§ 371 (c)(1),
(2) Date: Feb. 4, 2015

(87) PCT Pub. No.: WO2014/045884
PCT Pub. Date: Mar. 27, 2014

(65) Prior Publication Data
US 2015/0194680 A1    Jul. 9, 2015

(30) Foreign Application Priority Data

Sep. 19, 2012    (JP) ................. 2012-205697

(51) Int. Cl.
| | | |
|---|---|---|
| H01M 4/64 | (2006.01) | |
| H01M 4/13 | (2010.01) | |
| H01M 4/139 | (2010.01) | |
| H01M 4/62 | (2006.01) | |
| H01M 10/0525 | (2010.01) | |

(52) U.S. Cl.
CPC ............... *H01M 4/64* (2013.01); *H01M 4/13* (2013.01); *H01M 4/139* (2013.01); *H01M 4/62* (2013.01); *H01M 10/0525* (2013.01); *H01M 2220/20* (2013.01); *Y02E 60/122* (2013.01)

(58) Field of Classification Search
CPC ........... H01M 4/64; H01M 4/13; H01M 4/139
See application file for complete search history.

(56) References Cited

U.S. PATENT DOCUMENTS

| | | | |
|---|---|---|---|
| 2005/0241137 A1 | 11/2005 | Suzuki et al. | |
| 2012/0115027 A1 | 5/2012 | Uchida et al. | |
| 2012/0135304 A1 | 5/2012 | Uchida et al. | |
| 2013/0022864 A1* | 1/2013 | Uchida ............... | H01M 4/0404 429/211 |

(Continued)

FOREIGN PATENT DOCUMENTS

| | | |
|---|---|---|
| CN | 102292850 A | 12/2011 |
| JP | 11-73947 A | 3/1999 |
| JP | 2004-079370 A | 3/2004 |

(Continued)

*Primary Examiner* — Stewart Fraser
(74) *Attorney, Agent, or Firm* — Sughrue Mion, PLLC

(57) ABSTRACT

A lithium-ion secondary battery has an electrode sheet having a current collecting foil formed thereon with a mixture layer containing powdered mixture particles. On the current collecting foil, there are provided a binder coated section on which a binder layer is formed having patterned markings; and a binder non-coated section on which a binder layer is not formed. The mixture particles contain at least an electrode active material and a binder. The mixture layer is formed on the binder coated section and the binder non-coated section.

3 Claims, 14 Drawing Sheets

(56) References Cited

U.S. PATENT DOCUMENTS

2014/0079872 A1    3/2014    Uchida et al.

FOREIGN PATENT DOCUMENTS

| JP | 2005-340188 A | 12/2005 | | |
|----|---------------|---------|---|---|
| JP | 2010098186 A | 4/2010 | | |
| JP | 2011-216504 A | 10/2011 | | |
| JP | 2011216197 A | 10/2011 | | |
| JP | WO 2011128963 A1 * | 10/2011 | .......... | H01M 4/0404 |
| JP | 2014-078497 A | 5/2014 | | |
| JP | 2014-182936 A | 9/2014 | | |
| JP | 2014-191880 A | 10/2014 | | |
| JP | 2014-199738 A | 10/2014 | | |
| WO | 2011013414 A1 | 2/2011 | | |

* cited by examiner

LITHIUM-ION SECONDARY BATTERY

CROSS REFERENCE TO RELATED APPLICATIONS

This application is a National Stage of International Application No. PCT/JP2013/073935filed Sep. 5, 2013, claiming priority based on Japanese Patent Application No. 2012-205697 filed Sep. 19, 2012, the contents of all of which are incorporated herein by reference in their entirety.

TECHNICAL FIELD

The present invention relates to a lithium ion secondary battery and, particularly, to a lithium ion secondary battery including an electrode body having a current collecting foil formed thereon with a mixture layer made of powdered mixture particles containing electrode active material on a current collecting foil.

BACKGROUND ART

In recent years, along with the popularization of hybrid vehicles, electric vehicles, and others, there are growing demands for lithium ion secondary batteries to be used in drive power sources thereof. Accordingly, needs for high output power are increasing. To realize the high output power of a lithium ion secondary battery, it is necessary to reduce energy loss during large current emission. Thus, the technique of reducing the internal resistance of an electrode sheet has recently received attention.

As the technique of reducing the internal resistance of an electrode sheet, for example, Patent document 1 discloses an invention related to a lithium ion secondary battery in which an adhesive layer is formed on at least one surface of a current collecting foil, and a charged electrode material (complex particles containing electrode active material) is supplied onto the adhesive layer to form an electrode layer.

RELATED ART DOCUMENTS

Patent Documents

Patent Document 1: JP-A-2011-216504

SUMMARY OF INVENTION

Problems to be Solved by the Invention

However, in the technique of Patent Document 1, the adhesive layer covers the entire surface of the current collecting foil. The adhesive layer generally primarily consists of a binding material, or a binder, having high insulating property. This would cause a problem that the binder covering the current collecting foil surface remains as a thin insulative coating or film between the current collecting foil and the electrode material, leading to an increase in internal resistance in the electrode sheet in a vertical direction (which is hereinafter referred to as "penetration resistance" and particularly reaction resistance of a cell or battery to be measured under low temperature environment is referred to as "low-temperature reaction resistance").

On the other hand, in order to reduce the penetration resistance in the electrode sheet, it is conceivable to thinly form the adhesive layer. In this case, however, the electrode material is apt to peel off from the current collecting foil. If the electrode material peels off from more places or areas, conversely, the penetration resistance is likely to increase. Therefore, there is a limit to make the adhesive layer thinner for the purpose of ensuring a certain level of peel strength and reducing the penetration resistance.

The present invention has been made to solve the above problems and has a purpose to provide a lithium ion secondary battery capable of maintaining high peel strength between a current collecting foil and an electrode material and also reducing penetration resistance of an electrode sheet.

Means of Solving the Problems (1) To achieve the above purpose, one aspect of the invention provides a lithium ion secondary battery including an electrode sheet having a mixture layer made of powdered mixture particles formed on a current collecting foil, wherein the current collecting foil includes a binder coated section in which a binder layer is formed in a pattern design on the current collecting foil and a binder uncoated section in which the binder layer is not formed, and the mixture particles include at least an electrode active material and a binder, and the mixture layer is formed on the binder coated section and the binder uncoated section. Herein, the pattern design represents a dispersed spot pattern consisting of circles, ellipses, or other shapes which are regularly dispersed in plan view or a linear pattern consisting of vertical lines, oblique lines, lattice lines, or others which are regularly dispersed in plan view.

According to the above aspect, the current collecting foil is provided thereon with the binder coated section in which the binder layer is formed in the pattern design and the binder uncoated section in which the binder layer is not formed. Specifically, on the surface of the current collecting foil, the binder coated section coated with the binder of a predetermined thickness and the binder uncoated section coated with no binder are formed The mixture layer formed on the binder coated section is thus formed on the current collecting foil through the binder layer formed in regularly dispersed manner on the surface of the current collecting foil. Accordingly, the current collecting foil and the mixture layer bond to each other through the binder layer, thereby enabling enhancing the peel strength between the current collecting foil and the electrode material.

Herein, the mixture particles include at least the electrode active material and the binder. Thus, the electrode active material particles can be bound to one another through the binder contained in the powder of the mixture particles.

Consequently, at the same time when the current collecting foil and the electrode active material are bound to each other through the binder of the binder coated section formed in the pattern design on the surface of the current collecting foil, the electrode active material particles are also bound to each other through the binder contained in the mixture particle powder. Thus, the mixture layer formed on the binder uncoated section can be held entirely in a binding state through the bounded electrode active material particles on the current collecting foil. Accordingly, the mixture layer formed on the binder uncoated section can also ensure peel strength with respect to the current collecting foil.

On the other hand, on the current collecting foil, the binder uncoated sections formed with no binder layer are regularly dispersed. Each binder uncoated section constitutes an exposed portion of the surface of the current collecting foil. Thus, the binder uncoated sections allow the current collecting foil and the electrode active material to directly contact with each other in regularly dispersed manner.

In the binder uncoated section, consequently, the current collecting foil and the electrode active material directly contact with each other without interposing the binder layer serving as an insulating body therebetween, so that a conductive path serving as an electrically conducting path can be formed. This can contribute to reduction of penetration resistance in the electrode sheet. It is therefore possible to provide a lithium ion secondary battery capable of maintaining high peel strength between the current collecting foil and the electrode material and also reducing penetration resistance of the electrode sheet.

(2) In the lithium ion secondary battery described in (1), preferably, the binder coated section is formed as dispersed pattern spots in plan view on the current collecting foil.

According to the above aspect, the binder coated sections are formed in the dispersed spot pattern (dispersed pattern spots) in plan view on the current collecting foil. As compared with a liner pattern, therefore, the dispersed pattern spots are uniformly distributed over a plane and the shape of the pattern is more stable and is less likely to lack. Accordingly, this configuration enables uniformly and stably ensuring the peel strength of the mixture layer formed on the current collecting foil and also uniformly and stably reducing the penetration resistance.

(3) In the lithium ion secondary battery described in (2), preferably, the dispersed pattern spots each have a width of 10 to 15 μm and a pitch of 23 to 40 μm.

Since the dispersed pattern spots each have a width of 10 to 15 μm and a pitch of 23 to 40 μm, the dispersed pattern spots each having a predetermined size can be more uniformly formed. This makes it possible to more stably ensure the peel strength of the mixture layer formed on the current collecting foil and also more stably reduce the penetration resistance.

Effects of the Invention

The present invention can provide a lithium ion secondary battery capable of maintaining high peel strength between a current collecting foil and an electrode material and also reducing penetration resistance of an electrode sheet.

MODE FOR CARRYING OUT THE INVENTION

A detailed description of a preferred embodiment of the present invention will now be given referring to the accompanying drawings. An entire structure of a lithium ion secondary battery will be explained first and then a first embodiment in which a mixture layer is formed on one surface of a current collecting foil will be explained in detail. Furthermore, a second embodiment in which a mixture layer is formed on both surfaces of a current collecting foil will be explained in detail. A third embodiment will be finally explained in detail in which groove-like recesses having intersections are engraved in an engraved gravure roll, a coating liquid or solution to be carried in the groove-like recesses liquid-shrinks toward the intersections, thereby forming binder coated sections as dispersed pattern spots on the current collecting foil.

<Structure of Lithium Ion Secondary Battery>

Figure 1:
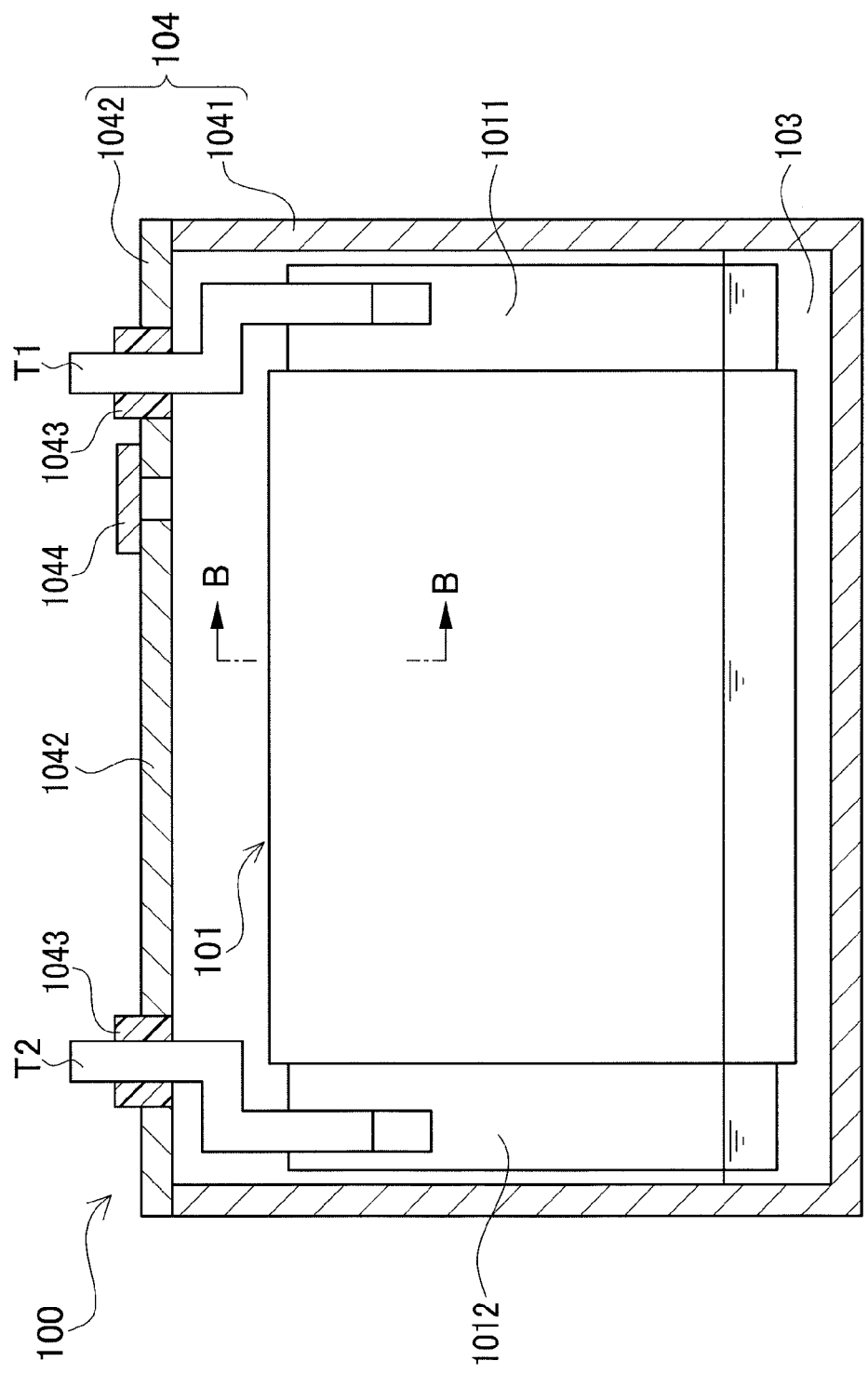
FIG. 1 is a sectional view of a lithium ion secondary battery in a present embodiment.
Figure 2:
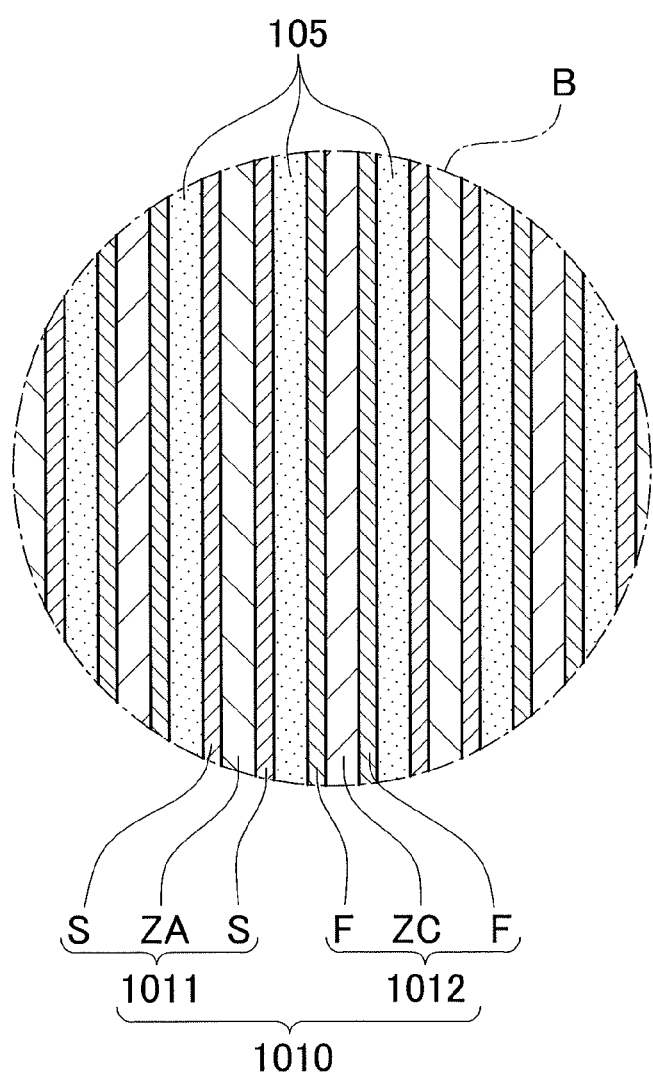
FIG. 2 is a detailed electrode diagram (an enlarged sectional view of a part B) of the lithium ion secondary battery shown in FIG. 1.

A structure of a lithium ion secondary battery in the present embodiment will be explained first. FIG. 1 is a sectional view of the lithium ion secondary battery in the present embodiment. FIG. 2 is a detailed electrode diagram (an enlarged sectional view of a part B) of the lithium ion secondary battery shown in FIG. 1.

As shown in FIG. 1, a lithium ion secondary battery 100 is provided with an electrode body 101, an electrolyte 103, and a battery case 104 housing them. The battery case 104 includes a case body 1041 and a closing plate 1042. This closing plate 1042 has insulating members 1043 and a safety valve 1044.

As shown in FIGS. 1 and 2, the electrode body 101 is produced in such a manner that a mixture layer is formed of a positive active material or negative active material bound with a binder or the like to a web-shaped current collecting foil Z (ZA, ZC), producing a positive electrode sheet 1011 and a negative electrode sheet 1012, and these positive electrode sheet 1011 and negative electrode sheet 1012 are wound together with separators 105 interposed therebetween into a flattened shape. The positive electrode sheet 1011 and the negative electrode sheet 1012 are also collectively referred to as an electrode sheet 1010. On a right side in FIG. 1, an external terminal T1 of the positive electrode sheet 1011 protrudes from the closing plate 1042. On a left side in FIG. 1, an external terminal T2 of the negative electrode sheet 1012 protrudes from the closing plate 1042. In a lower part of the case body 1041, the electrolyte 103 is stored in which the positive electrode sheet 1011 and the negative electrode sheet 1012 are immersed.

As shown in FIG. 2, the positive electrode sheet 1011 is made of an aluminum foil ZA serving as a positive current collecting foil on both surfaces of which positive mixture layers S are formed. On the other hand, the negative electrode sheet 1012 is made of a copper foil ZC serving as a negative current collecting foil on both surfaces of which negative mixture layers F are formed. The positive electrode sheet 1011 and the negative electrode sheet 1012 are different in kind of electrode active material used respectively but basically similar in structure. Accordingly, the electrode sheet 1010 of the lithium ion secondary battery 100 in the present embodiment is applicable to the positive electrode sheet 1011 and the negative electrode sheet 1012.

(First Embodiment)

<Method for Manufacturing the Lithium Ion Secondary Battery>

Figure 3:
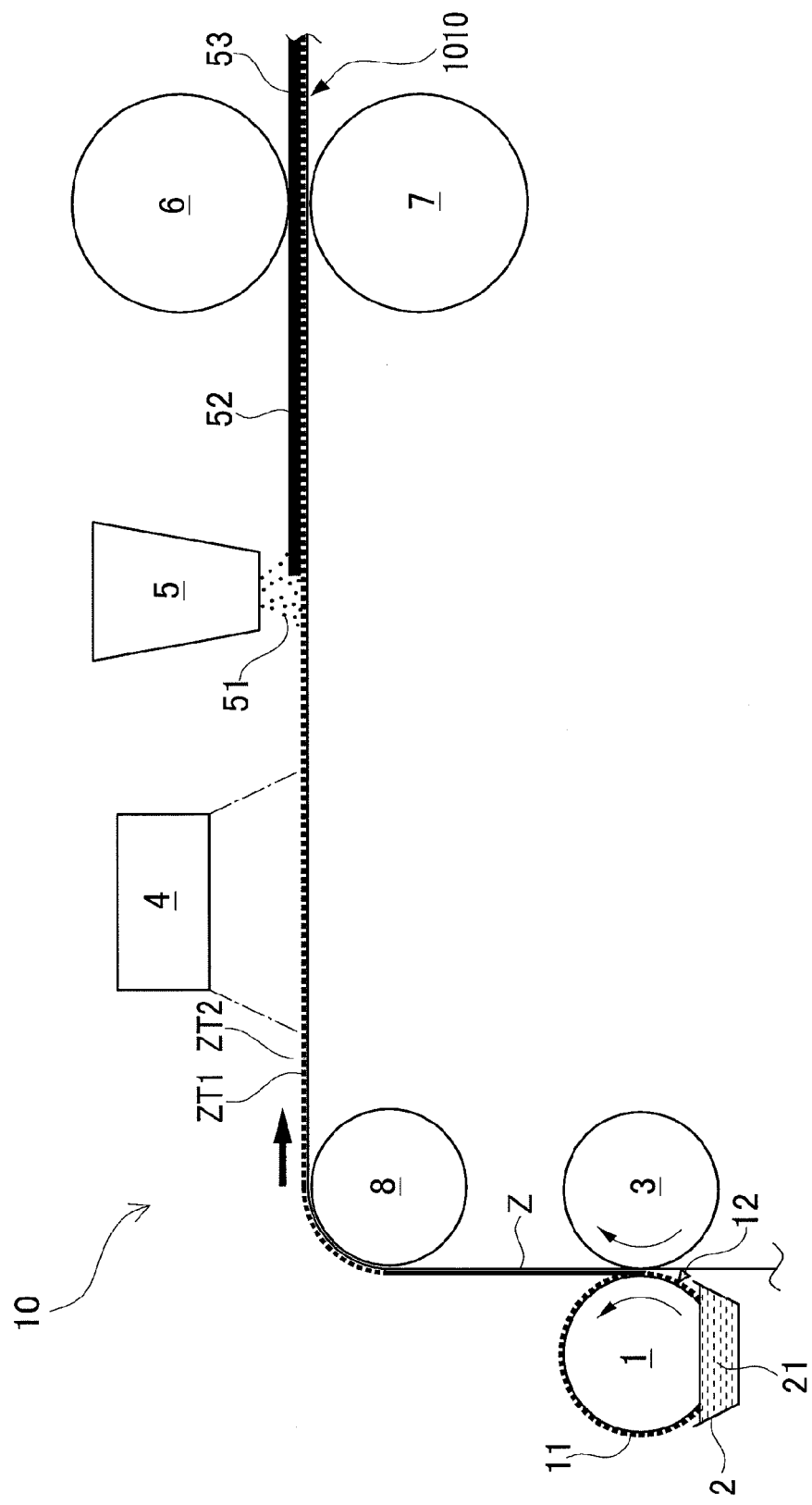
FIG. 3 illustrates part of a manufacturing apparatus for manufacturing an electrode sheet of the lithium ion secondary battery in a first embodiment.

A method for forming the mixture layer on one surface of the current collecting foil of the electrode sheet of the lithium ion secondary battery in the first embodiment will be explained below. FIG. 3 illustrates part of a manufacturing apparatus for manufacturing the electrode sheet of the lithium ion secondary battery in the first embodiment.

As shown in FIG. 3, a manufacturing apparatus 10 for manufacturing the electrode sheet 1010 of the lithium ion secondary battery in the first embodiment includes an engraved gravure roll 1, a liquid pan 2, a backup roll 3, a radiator 4, a powder feeder 5, pressure rollers 6 and 7, and a feed roller 8.

The engraved gravure roll 1 is a cylindrical roll for applying a binder coating liquid 21 in a pattern design onto the surface of the current collecting foil Z. The current collecting foil Z has a thickness of about 20 μm. The coating outer peripheral surface of the cylindrical roll is formed with engraved grooves 11 engraved in a predetermined pattern design. The pattern design to be applied by the engraved grooves 11 will be explained later in detail. The engraved gravure roll 1 is designed with diameter, hardness, material, and others, selected in consideration of rigidity during high-speed rotation, abrasion resistance of the engraved grooves 11, and others.

The liquid pan 2 is a bath that stores the coating liquid 21 to be applied in a pattern design by the engraved gravure roll 1. This coating liquid 21 is an aqueous dispersion of SBR (styrene-butadiene rubber) serving as a binding material, or a binder. The concentration of SBR is 10.0 to 40 wt %. The glass transition temperature of SBR is in a range of −50° C. to 30° C. The coating liquid 21 may contain a thickening agent and a surface acting agent in order to adjust viscosity and wettability of the coating liquid. The thickening agent and the surface acting agent may be selected from known agents. The binder may be selected from aqueous polyacrylic acid (PAA) or organic-solvent polyvinylidene fluoride (PVDF) as well as SBR.

A lower end of the engraved gravure roll 1 is immersed in the coating liquid 21 stored in the liquid pan 2. The coating liquid 21 is carried in the engraved grooves 11 as the engraved gravure roll 1 is rotated. Above the liquid pan 2, a scraper 12 is placed in contact with the outer peripheral surface of the engraved gravure roll 1 to scrape off excess coating liquid 21 sticking to the outer peripheral surface in order to prevent dripping of the coating liquid 21 carried in the grooves 11 of the roll 1.

The backup roll 3 made of rubber is placed opposite the engraved gravure roll 1. When the web-shaped current collecting foil Z is passing through a gap between the engraved gravure roll 1 and the backup roll 3, the coating liquid 21 carried in the engraved grooves 11 is transferred and coated onto one surface of the current collecting foil Z. This coating is performed at a constant speed, thereby regularly forming binder coated sections ZT1 and uncoated sections ZT2 corresponding to a pattern design of the engraved grooves 11 onto the current collecting foil Z. An exposed surface area ratio of the current collecting foil Z (representing a surface area ratio of the binder uncoated sections ZT2 to a total surface area of the binder coated sections ZT1 and the binder uncoated sections ZT2, the same applies to the following) is in a range of about 10 to 85%. The coating speed to the current collecting foil Z is about 30 to 60 m/min. The coating thickness of the binder coated sections ZT1 is about several μm (preferably, 1.5 μm).

The current collecting foil Z applied with the coating liquid 21 is changed in its feed direction from a vertical direction to a horizontal direction by the feed roller 8 and then dried by the radiator 4. In the present embodiment, the glass transition temperature of SBR serving as the binder is equal to or higher than −50° C. Accordingly, when the current collecting foil Z is dried to a dried state by the radiator 4, the low-temperature reaction resistance can be decreased while increasing the adhesion property. In a case where the coating thickness of each binder coated section ZT1 is thin (e.g., about 1.5 μm), drying using the radiator 4 can be skipped. This is because water or moisture content is low and thus moisture can be volatilized during a subsequent powder forming process.

The powder feeder 5 is placed adjacent to the radiator 4 and behind in the feed direction. This powder feeder 5 is a device for continuously feeding powdered mixture particles 51 containing electrode active material, binder, and others with a predetermined thickness onto the binder coated sections ZT1 applied with the coating liquid 21 in the pattern design and the binder uncoated sections ZT2. The mixture particles 51 are produced by mixing electrode active material and binder each being in powder form. The binder used for the mixture particles 51 may be the same kind as or different kind from the binder used for the coating liquid 21. For the electrode active material, for example, amorphous coat graphite can be used as the negative active material. For the binder, for example, polytetrafluoroethylene (PTFE) can be used. The mixture particles 51 are prepared by blending graphite and PTFE at a ratio (wt %) of about 98:2.

As an alternative, the mixture particles 51 may be produced in a manner that the electrode active material, the binder, and the thickening agent are dissolved in a solvent, kneaded, and dried to be granulated. In this case, the mixing ratio (wt %) of the electrode active material, binder, and thickening agent is about 97.3:2.0:0.7. Herein, an accumulation amount of the mixture particles 51 is about 10 mg/cm$^2$ and the thickness of the accumulation layer 52 is about 100 to 120 μm.

The current collecting foil Z having passed through the powder feeder 5 then passes through between the pressure rollers 6 and 7. These pressure rollers 6 and 7 are devices for pressing an accumulation layer 52 of mixture particles accumulated by the powder feeder 5 to form a mixture layer 53 with a predetermined density. By pressure forming, the mixture layer 53 is bonded to the current collecting foil Z by the binder contained in the binder coated sections ZT1. Simultaneously, the electrode active material particles are bound to each other through the binder contained in the mixture particles 51. Accordingly, the mixture layer 53 can be in close contact with the current collecting foil Z, resulting in enhanced peel strength, and can form conductive paths continuous from the binder uncoated sections ZT2 (the exposed portions) of the surface of the current collecting foil to the electrode active material, resulting in reduction in penetration resistance. The thickness of the mixture layer 53 after pressing is about 80 μm.

The pressure rollers 6 and 7 also can heat the mixture layer 53 to about 100 to 150° C. This heating provides the effects of enhancing adhesion properties between the mixture layer 53 and the current collecting foil Z and also removing impurities such as volatile substances (solvent and moisture) contained in the mixture layer 53.

According to the lithium ion secondary battery in the first embodiment, as described above, the mixture layer 53 with high peel strength and low penetration resistance can be formed on one surface of the current collecting foil Z in the electrode sheet 1010. In a case where the mixture layer 53 is to be formed on each of both surfaces of the current collecting foil Z in the electrode sheet 1010, the above manufacturing method is repeated twice.

<Engraving Gravure Pattern Shape>

The pattern design to be applied by the engraved grooves 11 used in the manufacturing apparatus 10 for the lithium ion secondary battery in the first embodiment will be explained below. FIGS. 4A to 4E show examples of the pattern design applied by the engraved grooves in the manufacturing apparatus shown in FIG. 3.

As shown in FIGS. 4A to 4E, the applied binder coated sections ZT1 are formed in a pattern of dispersed spots (a dispersed pattern) (FIGS. 4A and 4B) or a pattern of lines (a linear pattern) (FIGS. 4C, 4D, and 4E) in plan view, each of the coated sections having a length larger in a direction parallel to the feed direction (a longitudinal direction) of the current collecting foil Z than a length in a direction (a width direction) vertical to the feed direction. The feed direction corresponds to an up-and-down direction (an arrow direction) in each figure.

Figure 4A:
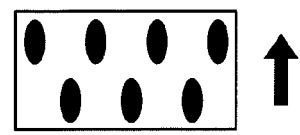
FIG. 4A illustrates an example of a pattern design (elliptic shape) of engraved grooves in the manufacturing apparatus shown in FIG. 3.

The design shown in FIG. 4A consists of a pattern of ellipses long in the feed direction of the current collecting foil. These ellipses are arranged at a predetermined interval in a horizontal row perpendicular to the feed direction. The ellipses are also arranged in a zigzag pattern so that the ellipses in a latter horizontal row are displaced from the ellipses in a preceding row. The interval between the horizontal rows in the feed direction is determined so as not to make adjacent ones of the ellipses intersect each other. The length (major diameter) of a long axis of each ellipse is about several tens of μm and preferably about twice or triple the length (minor diameter) of a short axis.

Figure 4B:
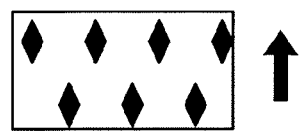
FIG. 4B illustrates an example of a pattern design (diamond shape) of engraved grooves in the manufacturing apparatus shown in FIG. 3.

The design shown in FIG. 4B consists of a pattern of diamonds long in the feed direction of the current collecting foil. The diamonds are arranged at a predetermined interval in each horizontal row perpendicular to the feed direction. The diamonds are also arranged in a zigzag pattern so that the diamonds in a latter horizontal row are displaced from the diamonds in a preceding row. The interval between the horizontal rows in the feed direction is determined so as not to make the adjacent diamonds intersect each other. The length of a diagonal line in each diamond parallel to the feed direction is about several tens of μm and preferably about twice or triple the diagonal length orthogonal thereto.

Figure 4C:
FIG. 4C illustrates an example of a pattern design (vertical line shape) of engraved grooves in manufacturing apparatus shown in FIG.3.

The design shown in FIG. 4C consists of a pattern of vertical lines parallel to the feed direction. The width of each vertical line and an interval between the vertical lines are about several tens of μm. Further, even though they are straight lines in the present figure, but may be curved lines. The widths of the vertical lines are constant in the present figure, but may be set to be regularly different between adjacent ones.

Figure 4D:
FIG. 4D illustrates an example of a pattern design (oblique line shape) of engraved grooves in the manufacturing apparatus shown in FIG. 3.

The design shown in FIG. 4D consists of a pattern of oblique lines inclined to the feed direction. The width of each oblique line and the interval between the oblique lines are about several tens of μm. Further, even though they are straight lines in the present figure, but also could be curved lines. The widths of the oblique lines are constant in the present figure, but also could be set to be regularly different between adjacent ones.

Figure 4E:
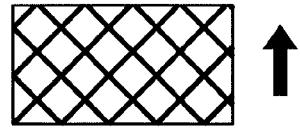
FIG. 4E illustrates an example of a pattern design (lattice pattern) of engraved grooves in the manufacturing apparatus shown in FIG. 3.

The design shown in FIG. 4E consists of a lattice pattern of oblique lines inclined to the feed direction and intersecting one another. The width of each oblique line and the intervals of the oblique lines constituting the lattice pattern are about several tens of μm. However, if the width of each oblique line is 50 μm or more, coating liquid is apt to clump together near a corner of the intersection of the oblique lines, causing pattern disturbance. Thus, the width of each oblique line is preferably about 10 to 40 μm. The oblique lines constituting the lattice pattern are straight lines in the present figure, but also may be curved lines. The widths of the oblique lines are constant in the present figure, but also could be set to be regularly different between adjacent ones.

FIGS. 4A to 4E show preferable examples as the pattern shape of the gravure pattern, but the invention is not limited thereto. For instance, the ellipses could be arranged continuously in the feed direction or the ellipses and the diamonds could be combined.

In the first embodiment, the planar shape of the binder coated sections ZT1 is such the each section ZT1 is longer in the direction parallel to the feed direction of the current collecting foil Z than in the direction perpendicular to the feed direction. This can form an air escape path extending in the direction parallel to the feed direction in the engraved grooves 11 of the gravure roll. Thus, air is less likely to enter in the engraved grooves 11 of the gravure roll. Consequently, the coating liquid 21 in the engraved grooves 11 can be accurately transferred to the surface of the current collecting foil Z.

<Mechanism for Achieving both Peel Strength and Penetration Resistance of the Mixture Layer>

Figure 5:
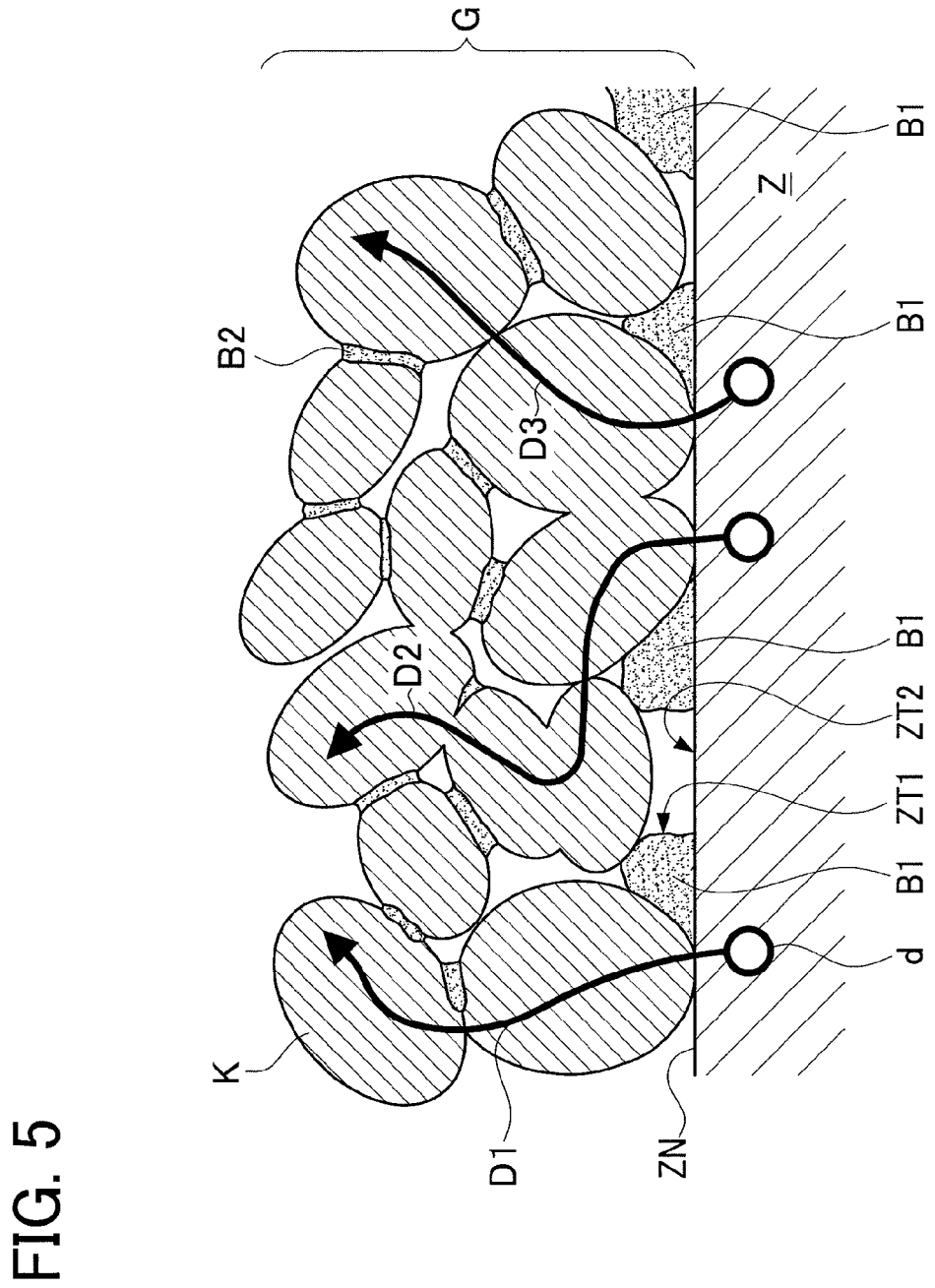
FIG. 5 is a schematic sectional diagram of a mixture layer in the lithium ion secondary battery in the present embodiment.
Figure 6:
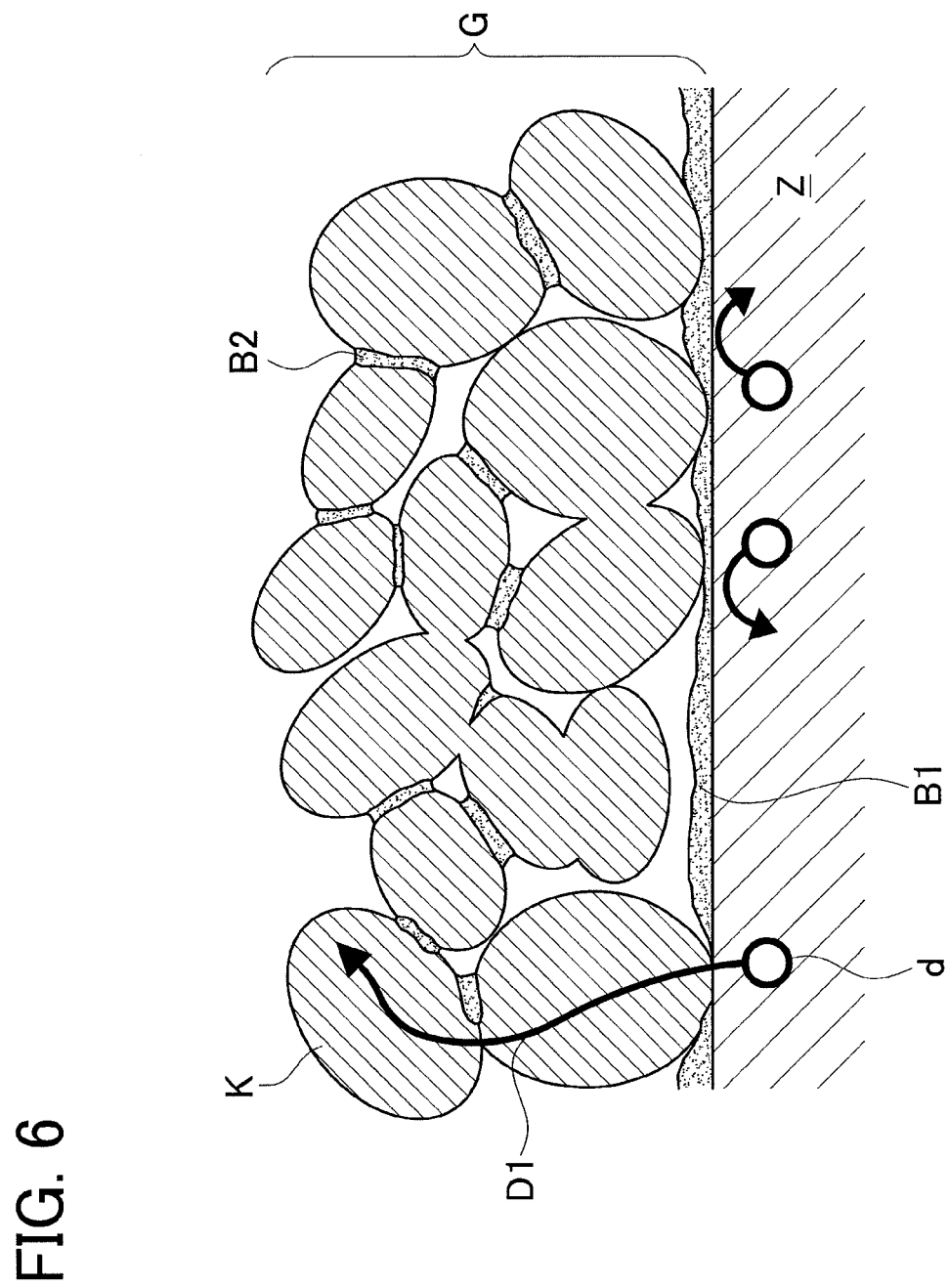
FIG. 6 is a schematic sectional diagram of a mixture layer in the present embodiment configured such that an exposed surface area ratio of a current collecting foil is less than 10%.

Next, the mechanism for achieving both peel strength and penetration resistance of the mixture layer in the electrode sheet of the lithium ion secondary battery in the first embodiment will be explained. FIG. 5 is a schematic sectional view of the mixture layer in the first embodiment. FIG. 6 is a schematic sectional view of a mixture layer under the condition that the exposed surface area ratio of the current collecting foil is set to less than 10%.

As shown in FIG. 5, a surface ZN of the current collecting foil Z is formed intermittently with the binder coated sections ZT1 containing the binder B1. In the surface ZN of the current collecting foil Z, portions uncoated with the binder B1 are uncoated sections (exposed portions) ZT2. On the binder coated sections ZT1 and the uncoated sections ZT2, particulate electrode active material K is accumulated together with particulate binder B2.

When the accumulation layer 52 of the electrode active material K and the binder B2 is pressed by the pressure rollers 6 and 7 (see FIG. 3), part of the electrode active material K is bonded to the surface of the current collecting foil Z through the binder B1 of the binder coated sections ZT1. Another part of the electrode active material K directly contacts with the uncoated sections (exposed portions) ZT2 of the current collecting foil Z.

Accordingly, since the electrode active material K is bonded to the current collecting foil Z through the binder B1, the peel strength between the current collecting foil Z and the electrode active material K is enhanced. Simultaneously, since the electrode active material K directly contacts with the uncoated sections (exposed portions) ZT2 of the current collecting foil Z, many conductive paths D1 to D3 allowing transmission of electrons d are formed.

When the electrode active material particles K are made close contact with each other by pressure of the pressure rollers, the particulate binder B2 placed in gaps between the electrode active material particles K is pressed and squeezed, thereby causing part of each electrode active material particle K to bond to adjacent electrode active material particles K through the pressed binder B2. Another part of each electrode active material particle K is brought in direct contact with adjacent electrode active material particles K not through the particulate binder B2.

Accordingly, the stacked or accumulated electrode active material particles K are bound to each other by the binder B2, thereby enhancing the peel strength, and simultaneously are in direct close contact with each other, thus forming the conductive paths D1 to D3 up to an upper end of a mixture layer G. Since many conductive paths D1 to D3 are formed from the surface of the current collecting foil Z to the upper end of the mixture layer G, the penetration resistance of the electrode sheet 1010 can be reduced. By the above binding mechanism, the lithium ion secondary battery in the first embodiment can achieve both enhancing the peel strength of the mixture layer G and reducing the penetration resistance of the electrode sheet 1010.

In the case where the exposed surface area ratio of the current collecting foil Z is less than 10%, as shown in FIG. 6, most of the electrode active material K is bonded to the current collecting foil Z through the binder B1 of the binder coated sections ZT1. Even when the accumulation layer 52 of the electrode active material K and the binder B2 is pressed by the pressure rollers 6 and 7 as shown in FIG. 3, the binder B1 of the binder coated sections ZT1 remains as a thin coating or film in a most part between the current collecting foil Z and the electrode active material K. The binder B1 itself in the binder coated sections ZT1 is an insulating body and thus the conductive path D1 to be formed is limited to the binder uncoated section (exposed portion) ZT2 slightly left. As a result, the peel strength of the mixture layer G is ensured to be high, but the penetration resistance is large.

Therefore, to more effectively provide both the peel strength and the penetration resistance of the mixture layer G in the electrode sheet 1010 of the lithium ion secondary battery 100, it is preferable to set the exposed surface area ratio of the current collecting foil Z to 10% or more and more preferable to set the exposed surface area ratio of the current collecting foil Z in a range of about 50 to 70%.

<Relationship between Exposed Surface Area Ratio of Current Collecting Foil and Low-Temperature Reaction Resistance>

Figure 7:
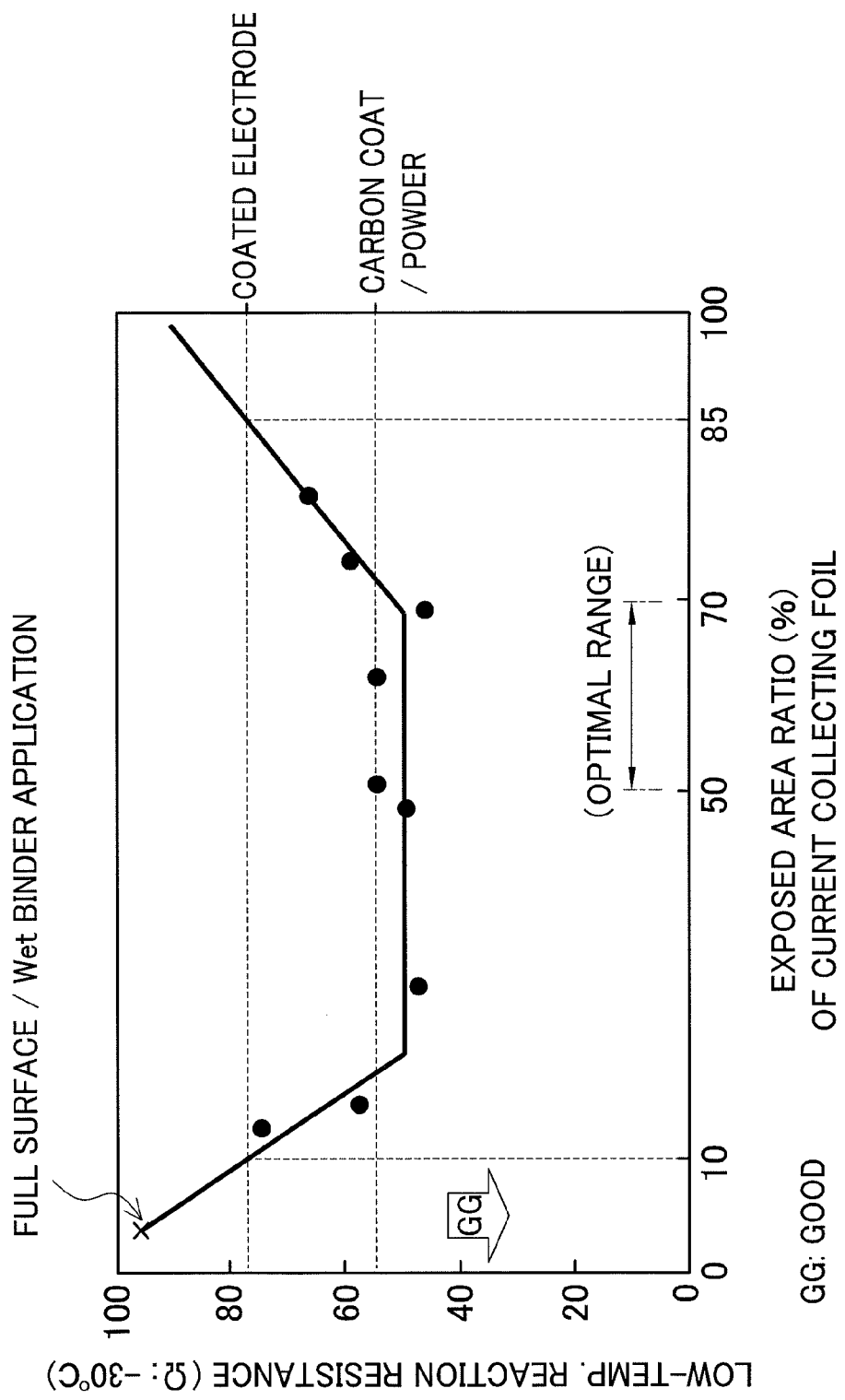
FIG. 7 is a graph showing a relationship between the exposed surface area ratio of the current collecting foil and low-temperature reaction resistance in a negative electrode sheet in the first embodiment.

Next, the relationship between the exposed surface area ratio of the current collecting foil Z and the low-temperature reaction resistance of the electrode sheet 1010 of the lithium ion secondary battery 100 in the first embodiment will be explained. FIG. 7 is a graph showing a relationship between the exposed surface area ratio of the current collecting foil Z and the low-temperature reaction resistance in the negative electrode sheet 1012 in the first embodiment. FIG. 7 is a plot showing behaviors of the low-temperature reaction resistance measured at −30° C. in the mixture layer of each negative electrode sheet 1012 formed by changing the pattern shapes of gravure pattern and using the current collecting foils Z having gradually larger exposed surface area ratios.

As shown in FIG. 7, when the exposed surface area ratio of the current collecting foil Z in the negative electrode sheet 1012 of the lithium ion secondary battery 100 in the first embodiment is in a range of about 10 to 85%, the low-temperature reaction resistance at −30° C. can be reduced to a lower value than that in a conventional coated electrode. Herein, the conventional coated electrode is an electrode sheet manufactured in such a manner that electrode active material, binder, and others are kneaded in a solvent to form a slurry paste, and this paste is applied thinly on the surface of a current collecting foil, and thereafter dried and pressed.

When the exposed surface area ratio of the current collecting foil Z is about 10%, the low-temperature reaction resistance at −30° C. is substantially the same level as the conventional coated electrode. However, as the exposed surface area ratio of the current collecting foil Z increases from about 10%, the low-temperature reaction resistance at −30° C. further decreases.

When the exposed surface area ratio of the current collecting foil Z is in the range of about 20 to 70%, the low-temperature reaction resistance at −30° C. can be reduced by about 30% than the conventional coated electrode level. This resistance is almost the same level as a carbon-coat/powder electrode having mixture particle power accumulated and pressed on a carbon-coated current collecting foil and is substantially stably constant.

As the exposed surface area ratio of the current collecting foil Z is larger than about 70%, the low-temperature reaction resistance at −30° C. gradually increases. When the exposed surface area ratio of the current collecting foil Z is about 85%, the low-temperature reaction resistance at −30° C. becomes almost the same level as the conventional coated electrode. Herein, increasing of the low-temperature reaction resistance is conceived to result from slip drop of part of the mixture layer on impact when it is cut into a required size after the negative electrode sheet 1012 is formed. Accordingly, it is preferable to set the exposed surface area ratio of the current collecting foil Z in a range of about 50 to 70% in order to more stably maintain the low-temperature reaction resistance at −30° C. to a low value.

<Influence of Glass Transition Temperature of Binder to be Applied in Pattern design>

An explanation will be given to the influence of glass transition temperature of the binder of the binder coated sections ZT1 applied in the pattern design on the low-temperature reaction resistance at −30° C. It is to be noted that the binder to be applied in the pattern design is the same as the binder used for the coating liquid 21.

In general, when a binder is fully dried, it is less likely to exhibit adhesion properties. Thus, even when an accumulation layer of electrode active material and the binder is formed by pressure after the binder is dried, the peel strength could not be obtained at a required level.

Therefore, while the binder is being wet before subjected to drying, the accumulation layer of the electrode active material and the binder is formed by pressure. However, when the accumulation layer of the electrode active material and the binder in a wet state is formed by pressure, the binder is liable to spread over, causing an increase in penetration resistance.

Accordingly, experiments made using various binders reveal that, when the glass transition temperature of each binder is set to −50° C. or higher, even when the binder is dried once, the adhesion property between the current collecting foil and the electrode active material is ensured when the accumulation layer of the electrode active material and the binder is pressure-formed, which is superior in battery performance. When the glass transition temperature of the binder is set to 30° C. or less, the peel strength obtained by binding in a drying (Dry) method can be increased.

Figure 8:
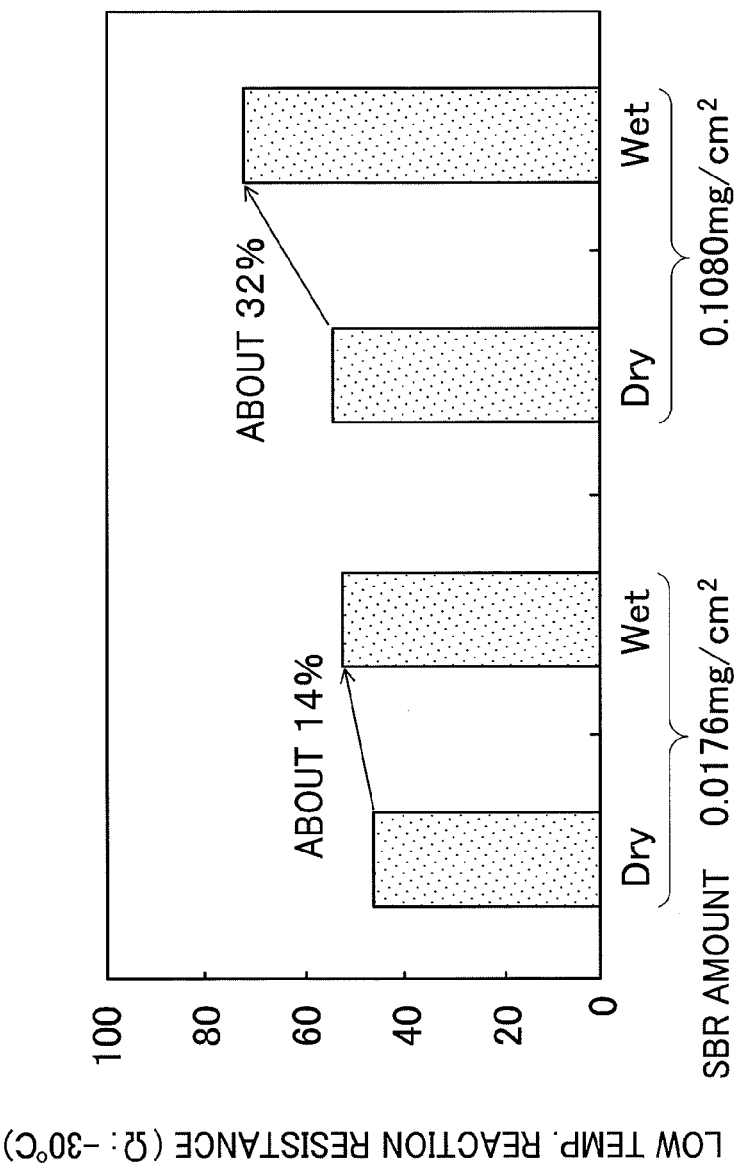
FIG. 8 is a graph showing influence on the low-temperature reaction resistance of the negative electrode sheet in the first embodiment by a content of a binder in a binder coated section and a difference between a dry method and a wet method.

FIG. 8 is a graph showing the influence of a difference between the dry (Dry) method and a wet (Wet) method on the low-temperature reaction resistance at −30° C. when the content of a binder in the binder coated sections ZT1 applied in the pattern design in the negative electrode sheet 1012 in the first embodiment is small. The binder in this case is SBR with a glass transition temperature in a range of −50° C. to 30° C. Two types of the content of SBR in the coating liquid, 0.0176 mg/cm$^2$ and 0.1080 mg/cm$^2$, are used.

When the content of the binder is 0.0176 mg/cm$^2$ as shown in FIG. 8, a difference in low-temperature reaction resistance at −30° C. between the dry method and the wet method is about 14%. Thus, the influence by the dry method and the wet method is not so large.

On the other hand, when the content of the binder is 0.1080 mg/cm$^2$, a difference in low-temperature reaction resistance at −30° C. is about 32%. Thus, the influence by the dry method and the wet method is remarkably large. In the dry method, the low-temperature reaction resistance at −30° C. can be reduced to almost the same level as that in the aforementioned carbon-coat/powder electrode (see FIG. 7). design (e.g., 0.1080 mg/cm$^2$) is small, as long as the glass transition temperature is set to −50° C. or higher, the adhesion properties between the current collecting foil Z and the electrode active material can be obtained when the accumulation layer of the electrode active material and the binder even dried once is subjected to pressure forming. This is superior in battery performance.

(Second Embodiment)
<Method for Manufacturing a Lithium Ion Secondary Battery>

Figure 9:
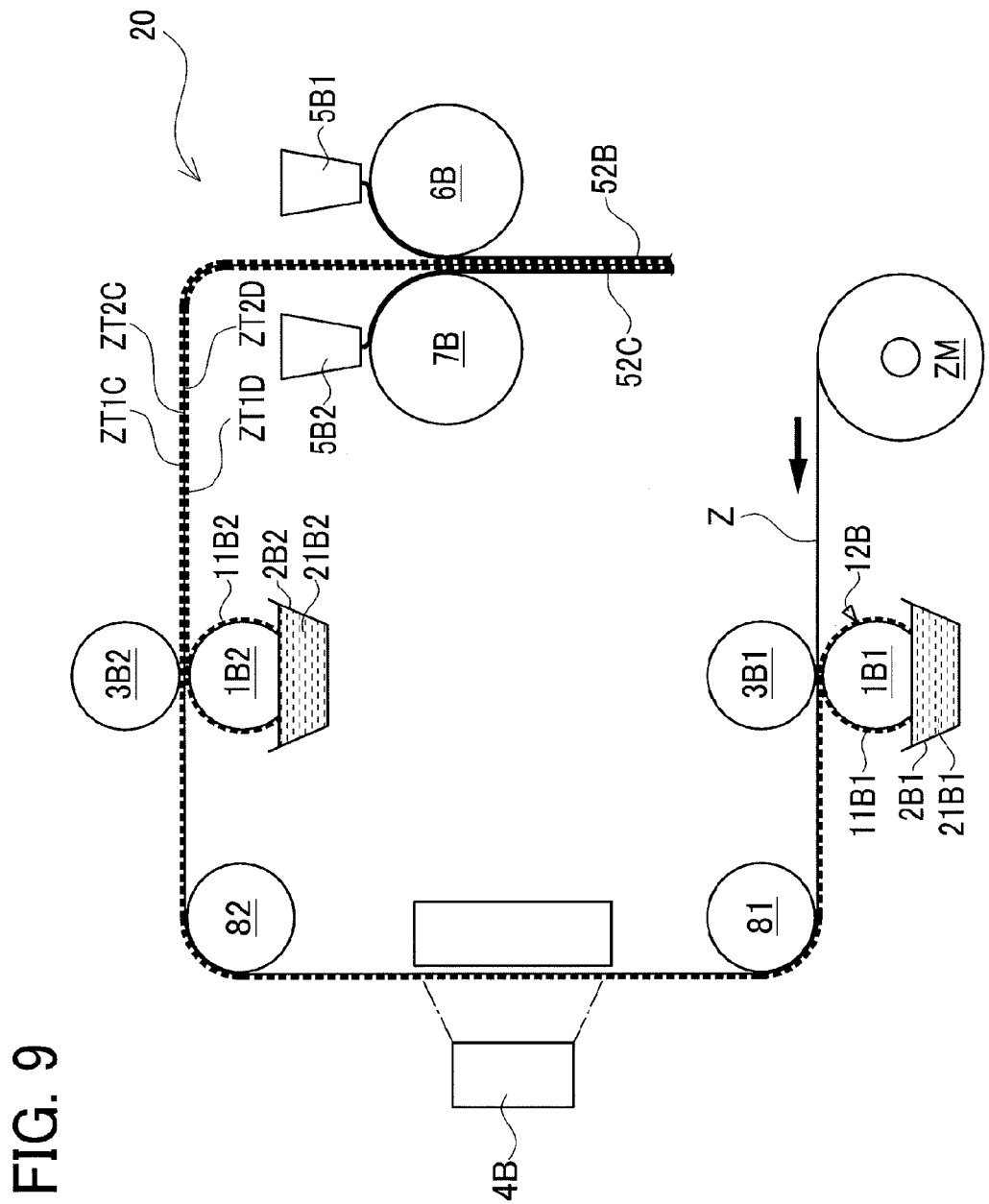
FIG. 9 illustrates a part of a manufacturing apparatus for manufacturing an electrode sheet of a lithium ion secondary battery in a second embodiment.

A method for forming a mixture layer on both surfaces of a current collecting foil of a lithium ion secondary battery in a second embodiment will be explained below. FIG. 9 shows a part of an apparatus for manufacturing the lithium ion secondary battery in the second embodiment. It is to be noted that this manufacturing apparatus for the lithium ion secondary battery in the second embodiment is identical to that in the first embodiment in the gravure pattern shapes and others excepting the mixture layers formed on both surfaces of the current collecting foil. Thus, the detailed explanation of common parts is omitted.

A manufacturing apparatus 20 for the lithium ion secondary battery in the second embodiment includes, as shown in FIG. 9, a first engraved gravure roll 1B1, a second engraved gravure roll 1B2, a first liquid pan 2B1, a second liquid pan 2B2, a first backup roll 3B1, a second backup roll 3B2, a radiator 4B, a first powder feeder 5B1, a second powder feeder 5B2, pressure rollers 6B and 7B, and guide rolls 81 and 82.

The first engraved gravure roll 1B1 and the second engraved gravure roll 1B2 are cylindrical rolls for applying coating liquids 21B1 and 21B2 onto the surfaces of the current collecting foil Z in a pattern design. Specifically, an outer peripheral side of the current collecting foil Z in a feed direction to be fed from an uncoiler ZM of the current collecting foil Z is coated in the pattern design by the first engraved gravure roll 1B1. An inner peripheral side of the current collecting foil Z in the feed direction is coated in the pattern design by the second engraved gravure roll 1B2. The pattern design to be applied by each of the engraved grooves 11B1 and 11B2 is identical to that in the first embodiment.

The first liquid pan 2B1 and the second liquid pan 2B2 are baths that respectively store the coating liquids 21B1 and 21B2 to be applied by the corresponding engraved gravure rolls 1B1 and 1B2. Each of the coating liquids 21B1 and 21B2 is SBR aqueous dispersion. The concentration of SBR, the glass transition temperature thereof, and others are the same as those in the first embodiment.

The first backup roll 3B1 and the second backup roll 3B2 are arranged respectively opposite the first engraved gravure roll 1B1 and the second engraved gravure roll 1B2. The second backup roll 3B2 presses the outer peripheral side of the already coated current collecting foil Z in the feed direction. Accordingly, the current collecting foil Z is dried first by the radiator 4B. However, a non-adhesive roll is used as the second backup roll 3B2.

On both surfaces of the current collecting foil Z on the outer peripheral side and the inner peripheral side in the feed direction, there are regularly formed binder coated sections ZT1C and ZT1D corresponding to the pattern design of the engraved grooves and uncoated sections ZT2C and ZT2D. The exposed surface area ratio of each surface of the current collecting foil Z is in a rage of about 10 to 85%. A speed of coating the current collecting foil Z is about 30 to 60 m/min. The film or layer thickness of each of the binder coated sections ZT1C and ZT1D is about 1.5 μm.

After both the surfaces of the current collecting foil Z on the outer peripheral side and the inner peripheral side in the feed direction are subjected to coating in the pattern design, the mixture particles containing the powdered particulate electrode active material and the powdered particulate binder are supplied from the first powder feeder 5B1 and the second powder feeder 5B2 respectively to be accumulated onto the pressure rollers 6B and 7B. The pressure rollers 6B and 7B are arranged opposite each other with respect to the current collecting foil Z and are rotated while pressing the laminated accumulation layer against the current collecting foil Z to form mixture layers 52B and 52C on the corresponding surfaces of the current collecting foil Z.

As described above, according to the lithium ion secondary battery 100B in the second embodiment, the mixture layers 52B and 52C are formed simultaneously on respective corresponding surfaces of the current collecting foil Z, resulting in further enhanced efficiency of production. In the method for forming the mixture layer 53 on one surface of the current collecting foil Z as in the first embodiment, the mixture layer 53 first formed is pressed again by the pressure rollers 6 and 7 when another mixture layer 53 is formed later on the other surface of the current collecting foil Z. This case may cause deformation and deterioration in electrode active material of the doubly pressured mixture layer 53. However, the lithium ion secondary battery 100B in the second embodiment provides an effect of preventing such defects.

(Third Embodiment)

Figure 10:
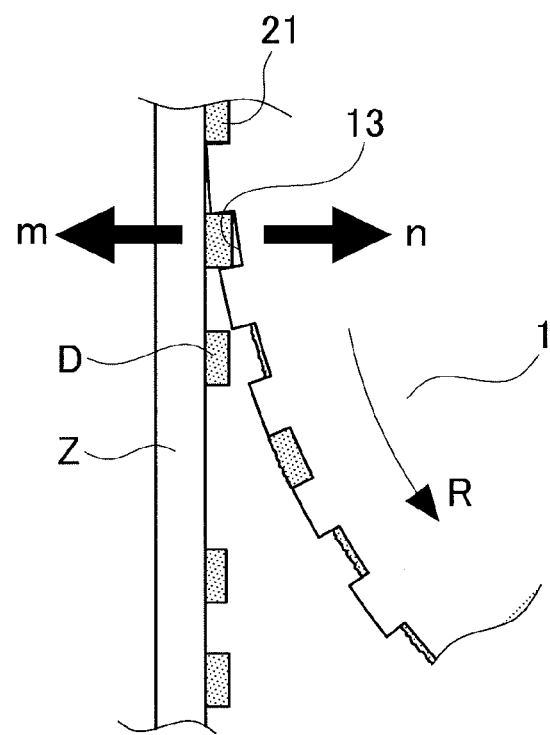
FIG. 10 is a schematic diagram to explain a manner of applying a binder coating liquid onto a current collecting foil using an engraved gravure roll formed thereon with engraved recesses in a dispersed pattern.
Figure 11:
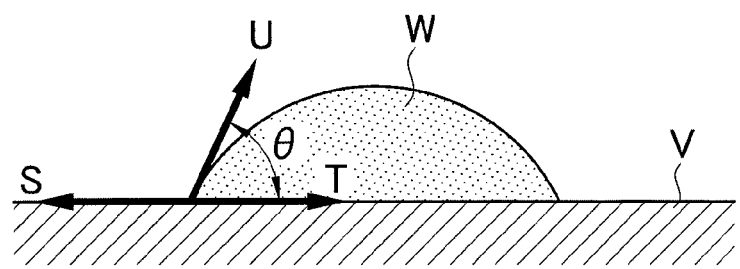
FIG. 11 is a sectional view showing a contact angle of a droplet falling on a solid surface.
Figure 12:
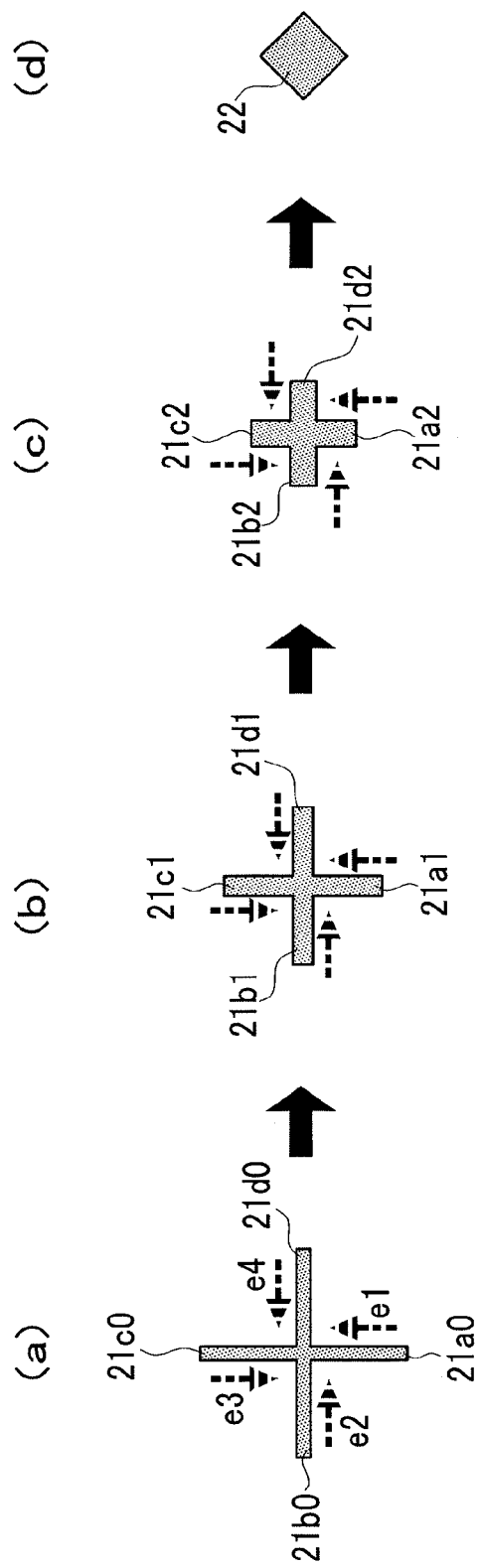
FIG. 12 is a schematic diagram to explain a manner that the binder coating liquid in groove-like recesses having an intersection at which the recesses intersect each other will shrink toward the intersection.
Figure 13:
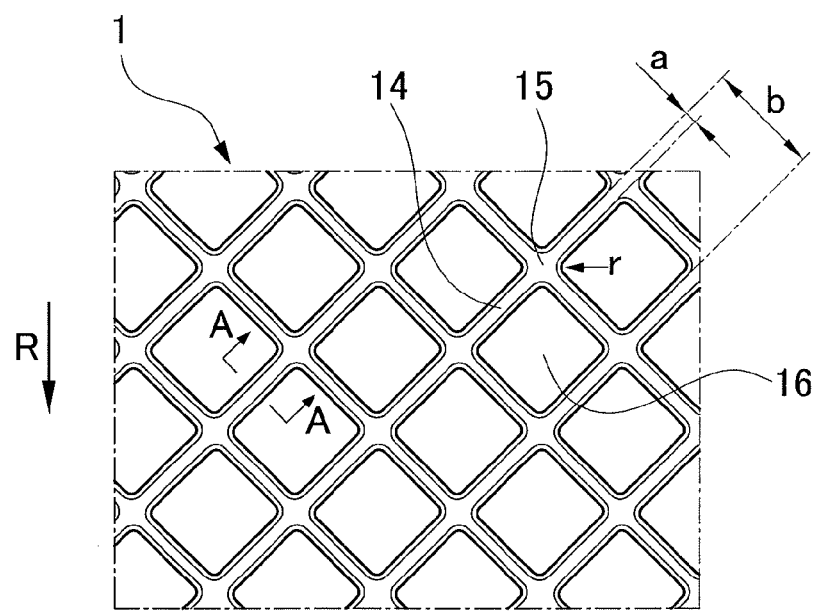
FIG. 13 is a plan view of groove-like recesses in a third embodiment.
Figure 14:
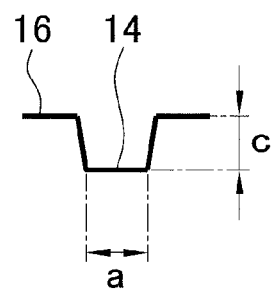
FIG. 14 is a sectional diagram taken along A-A in FIG. 13.

A third embodiment will be explained on an electrode sheet of a lithium ion secondary battery in which an engraved gravure roll to be used for engraving gravure coating is engraved with groove-like recesses having intersections at each of which the recesses intersect each other, and the coating liquid carried in the recesses will shrink at the intersections, forming binder coated sections in a pattern of dispersed spots (a dispersed pattern) on a current collecting foil. FIG. 10 is a schematic diagram to explain a manner of applying a coating liquid onto a current collecting foil using an engraved gravure roll having engraved recesses in the dispersed pattern. FIG. 11 is a sectional view showing a contact angle of a droplet falling on a solid surface. FIG. 12 is a schematic diagram to explain a manner that a coating liquid in groove-like recesses having an intersection at which the recesses intersect each other shrinks toward the intersection. FIG. 13 is a plan view of the groove-like recesses engraved in the engraved gravure roll in an apparatus for manufacturing the electrode sheet of the lithium ion secondary battery in the third embodiment. FIG. 14 is a A-A sectional diagram shown in FIG. 13.

This binder applying step is available for each of the manufacturing method used for the lithium ion secondary battery in the aforementioned first embodiment and the manufacturing method used for the lithium ion secondary battery in the second embodiment.

<Reversal Idea for Forming Binder Coated Section in Dispersed Pattern>

When the engraving gravure coating of a coating liquid onto a current collecting foil is to be performed, it is experimentally revealed that the formation of the binder coated sections in a dispersed pattern such as a circle pattern or a diamond pattern (hereinafter, also referred to as "dispersed coated portions") provides superior peel strength of the mixture layer and penetration resistance of the electrode sheet.

However, when dispersed recesses 13 are engraved in the engraved gravure roll 1 to form dispersed coated portions D on the current collecting foil Z as shown in FIG. 10, this would cause a problem that air is likely to enter in the dispersed recesses 13 and the coating liquid 21 is less likely to enter the recesses 13.

The dispersed recesses 13 each having a wall surface to entirely surround the coating liquid 21 has a high liquid holding property. Thus, the held coating liquid 21 is drawn in directions of arrows m and n and remains in the dispersed recesses 13 and thus is less transferred onto the current collecting foil Z.

As the result of trial and error, therefore, a reversal idea has been reached by engraving the engraved gravure roll 1 with a plurality of groove-like recesses intersecting one another at intersections, without engraving the dispersed recesses 13 on the engraved gravure roll 1, to form the dispersed coated portions D on the current collecting foil Z. Thus, the coating liquid 21 carried in the groove-like recesses shrinks in the intersections, thereby forming the binder coated sections ZT1 transferred in a dispersed pattern on the current collecting foil Z.

<Mechanism for Forming Dispersed Coated Portions>

The following explanation is given to the mechanism for forming the dispersed coated portions whereby the reversal idea has been generated.

As shown in FIG. 11, a droplet W of liquid falling on a solid V has a property of becoming round in semispherical form by its surface tension. Herein, assuming that the surface tension of a solid is S, the surface tension of a liquid is U, and the boundary tension between the solid and the liquid is T, the following relationship is established:

$$S = U \times \cos \theta + T \quad (1).$$

This expression (1) is called "Young's equation". An angle θ between a tangent to this droplet and the solid surface is called a "contact angle" which is an index representing the wettability of the liquid to the solid surface. As the contact angle θ is smaller, the wettability is higher, so that the droplet becomes flat and is less easy to shrink. As the contact angle θ is larger, the wettability is lower, so that the droplet rises and is easy to shrink.

From the expression (1), as the boundary tension T between the solid and the liquid is set to be low, the contact angle θ becomes larger. The boundary tension T between the solid and the liquid can be reduced by making smaller the area of the liquid contacting with the solid.

Therefore, when the wall surface of a recess engraved in the engraved gravure roll is made open in one direction, the boundary tension T of the carried coating liquid is reduced in the one direction, increasing the contact angle θ, allowing the liquid to shrink toward the one direction.

FIG. 12(a) to (d) shows conceptual diagrams that the coating liquid is carried in groove-like recesses intersecting each other at an intersection and the coating liquid carried in a cross shape centered on the intersection shrinks toward the intersection.

FIG. 12(a) shows a stage previous to liquid shrinkage of the coating liquid portions 21a0 to 21d0 carried in a cross shape centered on the intersection. The coating liquid portions 21a0 to 21d0 each have a liquid width equal to the groove width of each groove-like recess and extend in an extending direction of each recess. A wall surface of each groove-like recess is open in the extending direction. Accordingly, in the coating liquid portions 21a0 to 21d0, the boundary tension acting in the extending direction of each recess become lower. Thus, liquid shrinking forces e1 to e4 acting toward the intersection act on the coating liquid portions 21a0 to 21d0.

FIGS. 12(b) and (c) show stages in the course of the coating liquid portions 21a1 to 21d1 and 21a2 to 21d2 carried in a cross shape gradually shrinking toward the intersection. The coating liquid portions 21a1 to 21d1 and 21a2 to 21d2 are increased in liquid width and decreased in length as the liquid shrinkage advances.

FIG. 12(d) shows a stage that the coating liquid 22 carried in the cross shape has shrunk to finally concentrate in the intersection, forming a dispersed cluster. The coating liquid 22 forming the dispersed cluster in this intersection is transferred as the dispersed binder coated section onto the current collecting foil Z. At that time, the intersection is not surrounded by wall surfaces, so that the liquid holding property of the coating liquid 22 in the intersection is lower than normal portions. Thus, the coating liquid 22 is reliably transferred as the dispersed binder coated section ZT1 onto the current collecting foil Z.

<Groove-like Recesses of Engraved Gravure Roll>

An explanation is given to the engraved shape of the engraved gravure roll 1 to be used for engraving gravure coating whereby realizing the coating principle (mechanism) of forming the dispersed binder coated sections mentioned above.

As shown in FIGS. 13 and 14, the engraved gravure roll 1 to be used for engraving gravure coating is engraved with a plurality of groove-like recesses 14 having intersections 15 at which the recesses intersect each other in a lattice pattern. The groove-like recesses 14 each have a predetermined groove width a and a predetermined groove depth c. The recesses 14 consist of linear grooves arranged at a predetermined groove pitch b. Between the adjacent recesses 14, a flat raised portion 16 is formed. In each intersection 15, each of the raised portions 16 has a corner r. The groove-like recesses 14 are formed to incline at an angle of about 45° with respect to a rotation direction R of the engraved gravure roll 1 in consideration of air removal. The groove width of the groove-like recesses 14 is determined so that the size at an upper end is slightly larger than the size at a lower end in consideration of liquid removal.

In FIG. 13, lattice-shaped grooves are formed of the groove-like recesses 14, each two of which intersect each other. An intersecting angle may be arbitrary and is not necessarily a right angle. Further, radial pattern grooves may be formed of groove-like recesses 14, two or more of which radially intersect one another.

For instance, the shape of the groove-like recesses 14 is preferably determined as a lattice pattern having a groove width a of 10 to 40 μm, a groove pitch b of 23 to 40 μm, and a groove depth c of 5 to 20 μm. It is also preferable that, when a droplet of the coating liquid falls on the current collecting foil Z, the contact angle between the tangent to the droplet on the surface of the current collecting foil and this surface of the current collecting foil is 50° or more.

The reason why the groove-like recesses 14 are shaped with the groove width a of 10 to 40 μm is that the groove width a of less than 10 μm causes the coating liquid to be partly segregated, making it difficult to form binder coated sections with uniform size and the groove width a of more than 40 μm causes liquid shrinkage along the wall surface, making it difficult to form a constant dispersed pattern.

The reason why the groove pitch b is set to 23 to 40 μm is that the groove pitch b of less than 23 μm causes the adjacent coating liquid portions to coalesce, thereby making it difficult to form uniform sized binder coated sections, and the groove pitch b of more than 40 μm causes dispersed pattern formed by liquid shrinkage to be uneven.

Further, the reason why the groove depth c is set to 5 to 20 μm is that the groove depth c of less than 5 μm could not form a required Wet coating thickness and the groove depth c of more than 20 μm increases the liquid holding property, resulting in a high possibility that part of the coating liquid could not be transferred.

Furthermore, the reason why the contact angle between the tangent to the droplet with the surface of the current collecting foil and this surface of the current collecting foil when the coating liquid falls on the current collecting foil Z is set to 50° or more is that the contact angle of less than 50° provides high wettability of the coating liquid, thus making it difficult for the coating liquid to shrink in the intersection of the groove-like recesses.

Adding of a thickening agent (e.g., CMC (carboxymethyl cellulose)) to the coating liquid tends to increase the contact angle. Adding of a surface acting agent to the coating liquid tends to decrease the contact angle. Accordingly, in the present embodiment, a predetermined amount (about 0.2 to 0.4 wt %) of CMC (carboxymethyl cellulose) is added to the coating liquid, so that the liquid shrinkage property can be enhanced, thereby enabling forming a uniform dispersed pattern of binder coated sections.

It was experimentally found through trial and error that it is preferable to form the groove-like recesses engraved in the engraved gravure roll to be used in engraving gravure coating in a lattice pattern with a groove width of 10 to 40 μm, a groove pitch of 23 to 40 μm, and a groove depth of 5 to 20 μm, and set the contact angle of the tangent to a droplet formed when the coating liquid falls on the current collecting foil Z and the surface of the current collecting foil to 50° or more, in order to adjust the Wet coating thickness before drying to 1.0 to 6.0 μm (1.5 μm is desired).

<Examples of Dispersed Coated Portions>

Figure 15:
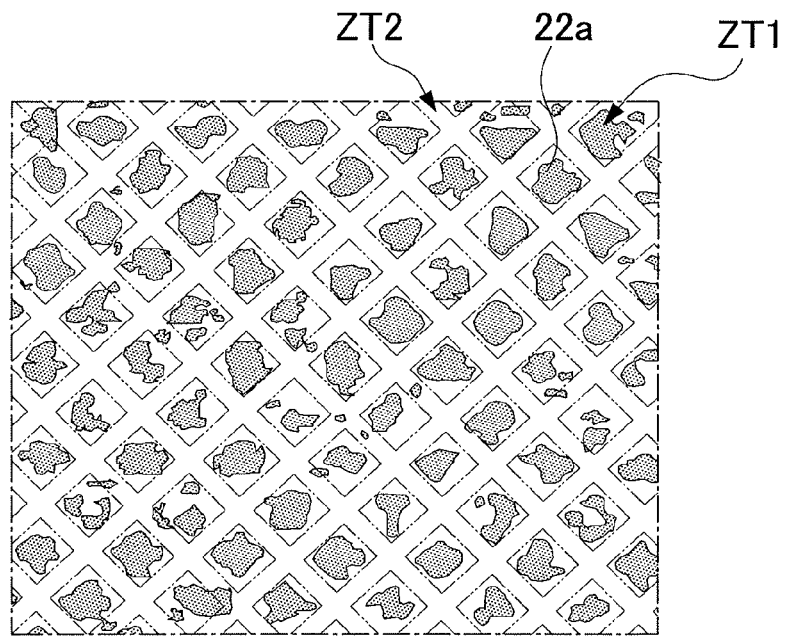
FIG. 15 is a plan view schematically depicting an SEM image of the coating liquid applied onto a current collecting foil under the condition that dispersed pattern spots of binder coated sections each have a width 10 μm, a pitch of 23 μm, and a thickness of 5 μm.
Figure 16:
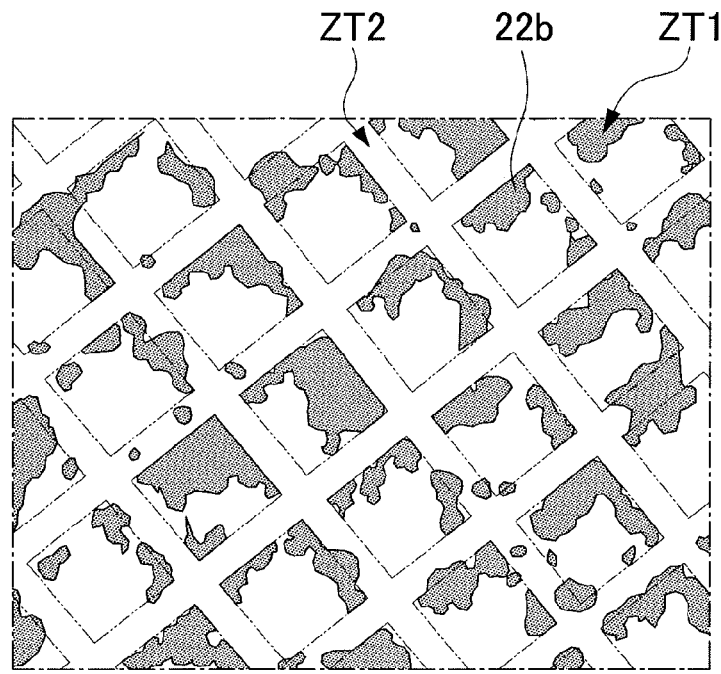
FIG. 16 is a plan view schematically depicting an SEM image of the coating liquid applied onto a current collecting foil Z under the condition that dispersed pattern spots of binder coated sections each have a width of 20 μm, a pitch of 40 μm, and a thickness of 5 μm.
Figure 17:
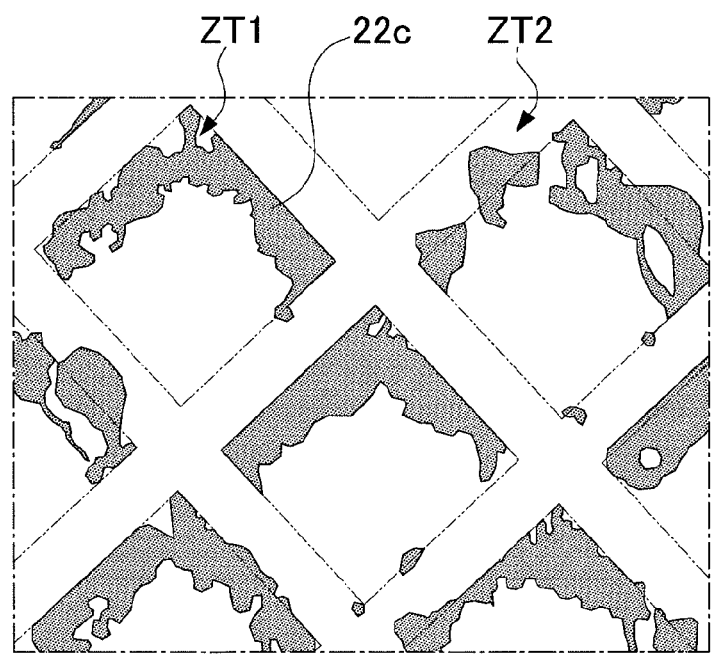
FIG. 17 is a plan view schematically depicting an SEM image of the coating liquid applied onto a current collecting foil Z under the condition that a dispersed pattern spots of binder coated sections each have a width of 40 μm, a pitch of 40 μm, and a thickness of 5 μm.

Next, an explanation is given to examples of the binder coated section ZT1 formed of the binder in a dispersed pattern on the current collecting foil Z by using the groove-like recesses of the engraved gravure roll 1 mentioned above. The binder coated sections ZT1 are formed of a pattern of dispersed spots 22a, 22b, or 22c on the current collecting foil. FIG. 15 is a plan view schematically depicting an SEM image of the coating liquid coated onto the current collecting foil under the condition that the dispersed pattern spots each have a width of 10 μm, a pitch of 23 μm, and a thickness of 5 μm. FIG. 16 is a plan view of schematically depicting an SEM image of the coating liquid coated on the current collecting foil Z under the condition that the dispersed pattern spots each have a width of 20 μm, a pitch of 40 μm, and a thickness of 5 μm. FIG. 17 a plan view of schematically depicting an SEM image of the coating liquid coated on the current collecting foil Z under the condition that the dispersed pattern spots each has a width of 40 μm, a pitch of 40 μm, and a thickness of 5 μm.

In the binder coated sections ZT1 shown in FIG. 15, most of the dispersed pattern spots 22a are formed regularly with a nearly constant size. Further, the binder uncoated sections ZT2 are formed regularly with a nearly constant width. There is not found any adhesion or coalescence of adjacent dispersed pattern spots 22a in the binder coated sections ZT1 and partial segregation thereof.

In the binder coated sections ZT1 shown in FIG. 16, the dispersed pattern spots 22b are formed with somewhat uneven size as compared with the dispersed pattern spots 22a of FIG. 15. This is conceivably because as the groove width and the groove pitch are larger, clumps of the coating liquid separate and shrink one by one in island-like shape. Accordingly, the dispersed pattern spots are preferably 10 to 15 μm in width and 23 to 40 μm in pitch.

In the binder coated section ZT1 shown in FIG. 17, the dispersed pattern spots 22c are each formed in a hook-like bent shape as compared with the dispersed pattern spots 22a of FIG. 15. This is conceivably because as the groove with is further larger, clumps of the coating liquid shrink along the wall surface.

As described above, as the width and the pitch of the dispersed pattern spots are larger, the binder coated sections ZT1 may be formed with various sizes on the current collecting foil Z. In this case, however, it was confirmed that when the thickness of the binder coated sections is increased up to about 20 µm, the liquid shrinkage could be improved.

Consequently, the dispersed binder coated sections ZT1 are formed on the current collecting foil Z, so that a plurality of groove-like recesses having intersections are engraved in the engraved gravure roll without engraving the dispersed recesses in the engraved gravure roll, causing the coating liquid carried in the groove-like recesses to shrink in each intersection. Thus, the effectiveness of the method for forming the binder coated sections transferred onto the current collecting foil Z in the dispersed pattern can be confirmed.

INDUSTRIAL APPLICABILITY

The present invention is utilizable as a lithium ion secondary battery to be mounted in an electric vehicle, a hybrid vehicle, and others.

REFERENCE SIGNS LIST

1 Engraved gravure roll
2 Liquid pan
3 Backup roll
4 Radiator
5 Powder feeder
6, 7 Pressure roller
8 Feed roller
10 Manufacturing apparatus of lithium ion secondary battery
20 Manufacturing apparatus of lithium ion secondary battery
11 Engraved groove
12 Scraper
14 Groove-like recess
15 Intersection
21 Coating liquid
22 Coating liquid
22a Dispersed pattern spot
22b Dispersed pattern spot
22c Dispersed pattern spot
51 Mixture particle
52 Accumulation layer
53 Mixture layer
52B, 52C Mixture layer
100 Lithium ion secondary battery
1010 Electrode sheet
Z Current collecting foil
K Electrode active material
B1, B2 Binder
ZT1 Binder coated section
ZT2 Binder uncoated section

The invention claimed is:

1. A lithium ion secondary battery including an electrode sheet having a mixture layer made of powdered mixture particles formed on a current collecting foil,
wherein the current collecting foil includes a binder coated section in which a binder layer is formed in a pattern design on the current collecting foil and a binder uncoated section in which the binder layer is not formed,
the mixture particles include at least an electrode active material and a binder, and the mixture layer is formed on the binder coated section and the binder uncoated section,
the electrode sheet is a wound electrode sheet, and
the binder coated section has a length larger in a direction parallel to a longitudinal direction of the current collecting foil than a length in a direction vertical to the longitudinal direction in plan view.

2. The lithium ion secondary battery according to claim 1, wherein the binder coated section is formed as dispersed pattern spots in plan view on the current collecting foil.

3. The lithium ion secondary battery according to claim 2, wherein the dispersed pattern spots each have a width of 10 to 15 µm and a pitch of 23 to 40 µm.

* * * * *